UNITED STATES PATENT OFFICE.

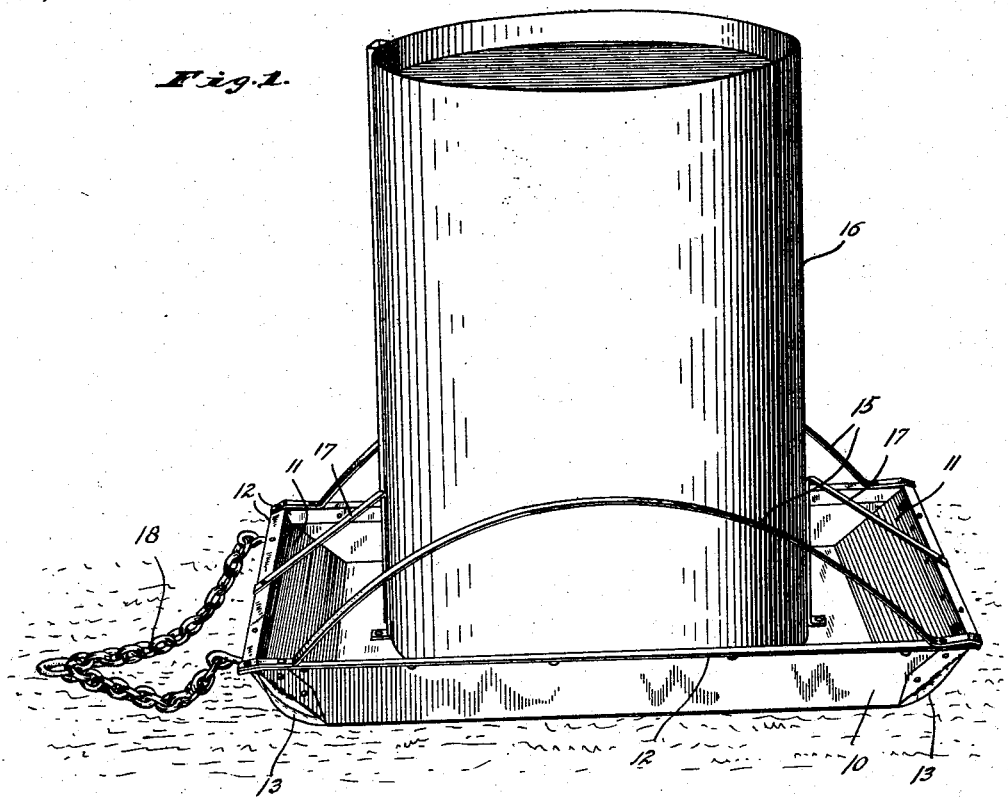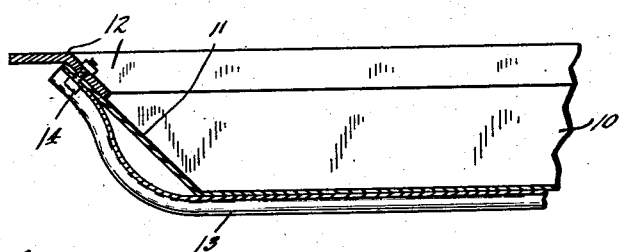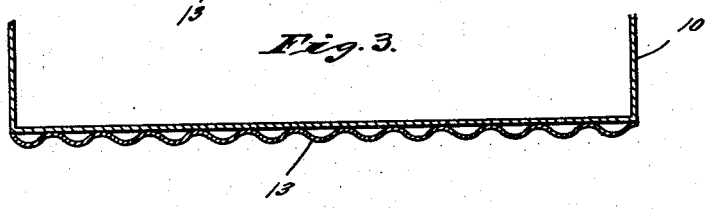

BURTON HERBERT GEDGE, OF ANDERSON, INDIANA.

SLED WATERING-FOUNTAIN.

1,162,473.      Specification of Letters Patent.      Patented Nov. 30, 1915.

Application filed August 3, 1914. Serial No. 854,659.

*To all whom it may concern:*

Be it known that I, BURTON H. GEDGE, a citizen of the United States, residing at Anderson, in the county of Madison and State of Indiana, have invented a new and useful Sled Watering-Fountain, of which the following is a specification.

In the use of stock watering fountains, it is desirable to be able to readily transport the fountains to and from the water supply and it has heretofore been common to provide such drinking fountains with supporting runners forming a sled to facilitate such transportation, but in such devices it has been found that the runners are apt to cut into soft ground; the comparatively thin drinking pan be injured by rocks and other unevennesses in the surface over which the structure is transported; and leaks caused in the pan owing to the comparatively unavoidable racking of the pan during transportation.

The object of my invention is to produce a simple, cheap and efficient sled structure for drinking fountains, which will obviate these difficulties.

The accompanying drawings illustrate my invention.

Figure 1 is a perspective view of the complete apparatus; Fig. 2 a fragmentary longitudinal vertical section showing the connection between the drinking pan and the supporting corrugated runner section; and Fig. 3 a transverse vertical section through the drinking pan and runner section.

In the drawings, 10 indicates the drinking pan of any desired form, preferably having upwardly inclined ends 11, 11 and a bracing frame of angle iron 12 around its top. The pan 10 is most conveniently formed of comparatively light galvanized sheet metal incapable of withstanding, for any considerable period, being dragged over the ground and, therefore, I provide, as a supporting sled or runner for the structure, a bottom of heavy corrugated metal 13, the corrugations running lengthwise and the ends being turned upwardly so that the tips thereof may be secured by rivets or bolts 14 passing through the depending arm of the end irons 12, the pan being thus held upon the runner. Guard bows 15 have their ends attached to the side irons 12 and project upwardly to prevent sidewise overturning of the reservoir or fountain structure 16 which may be of any desired form and preferably removably placed in the pan between the guards. End guards 17 are also attached to the end irons 12 and to the bottom of the pan so as to prevent longitudinal overturning of the reservoir.

A suitable yoke 18 may be attached to either or both of the end irons 12 so that the structure may be readily hauled along the ground and, as the pulling force is thus applied directly to the end of the corrugated sled structure, there will be practically no racking of the pan.

By the above construction a sled structure of the least possible height is produced, thus reducing to a minimum the possibility of overturning, and rendering the drinking pan within easy reach of small stock, which is not the case where supporting runners, forming a sled, are used. The corrugated sled portion is both laterally and longitudinally very stiff and, as it will engage the ground practically throughout its entire area, it can be hauled over very soft surfaces with the expenditure of a minimum amount of force.

I claim as my invention:

1. In a device of the class described, a pan and a runner bottom supporting said pan, said runner bottom being formed of a longitudinally corrugated sheet having an up-turned end.

2. In a device of the class described, a runner bottom formed of a longitudinally corrugated sheet having an up-turned end, and liquid retaining members associated with said runner bottom and carried thereby.

3. In a device of the class described, a runner bottom formed of a longitudinally corrugated sheet up-turned at both ends, and liquid retaining members associated with said sheet and carried thereby.

4. In a device of the class described, a runner bottom formed of a longitudinally corrugated sheet having its opposite ends up-turned, and a pan placed upon said runner bottom between said up-turned ends.

5. In a device of the class described, a runner bottom formed of a longitudinally corrugated sheet having an up-turned end and material-retaining members carried by the upper face of said sheet.

In witness whereof, I have hereunto set my hand at Indianapolis, Indiana, this thirty-first day of July, A. D. one thousand nine hundred and fourteen.

BURTON HERBERT GEDGE.

Witnesses:
FRED F. BARR,
F. G. MUSTARD.

Copies of this patent may be obtained for five cents each, by addressing the "Commissioner of Patents, Washington, D. C."